United States Patent
Nurikabe

(10) Patent No.: US 11,438,964 B2
(45) Date of Patent: Sep. 6, 2022

(54) RADIO-FREQUENCY MODULE AND COMMUNICATION DEVICE

(71) Applicant: Murata Manufacturing Co., Ltd., Kyoto (JP)

(72) Inventor: Yuji Nurikabe, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/715,848

(22) Filed: Dec. 16, 2019

(65) Prior Publication Data

US 2020/0205229 A1    Jun. 25, 2020

(30) Foreign Application Priority Data

Dec. 19, 2018    (JP) .............................. JP2018-237324

(51) Int. Cl.
*H04W 88/06* (2009.01)
*H04B 1/00* (2006.01)
*H04W 88/04* (2009.01)

(52) U.S. Cl.
CPC ............ *H04W 88/06* (2013.01); *H04B 1/006* (2013.01); *H04B 1/0053* (2013.01); *H04W 88/04* (2013.01)

(58) Field of Classification Search
CPC ..... H04W 88/06; H04W 88/04; H04B 1/0053
See application file for complete search history.

(56) References Cited

U.S. PATENT DOCUMENTS

| 8,036,148 B2 * | 10/2011 | Fukamachi | H04B 1/44 370/282 |
| 9,998,153 B2 * | 6/2018 | Balm | H04B 1/006 |
| 10,103,772 B2 * | 10/2018 | Pehlke | H04B 1/40 |

(Continued)

FOREIGN PATENT DOCUMENTS

| JP | 2020096313 A | * | 6/2020 | ............... | H03F 3/21 |
| WO | 2010/087307 A1 | | 8/2010 | | |
| WO | WO-2017199649 A1 | * | 11/2017 | ............... | H03F 3/19 |

OTHER PUBLICATIONS

Multilayer Diplexer DPX165950DT-8045A1 Datasheet, TDK, Apr. 2017 (Year: 2017).*

(Continued)

*Primary Examiner* — Gennadiy Tsvey
(74) *Attorney, Agent, or Firm* — Pearne & Gordon LLP

(57) ABSTRACT

A radio-frequency module includes: transmitting filter and receiving filters for a first communication band; transmitting filter and receiving filters for a second communication band; and a switch including first and second common terminals and first to fifth selection terminals. The second common terminal is connected to a first input terminal. A common terminal of the transmitting and receiving filters for the first communication band and a common terminal of the transmitting and receiving filters for the second communication band are connected respectively to the first and second selection terminals. The transmitting and receiving filters for the first communication band are connected respectively to the third selection terminal and a first output terminal. The transmitting and receiving filters for the second communication band are connected respectively to the fourth selection terminal and a second output terminal. The fifth selection terminal is connected to a third output terminal.

14 Claims, 11 Drawing Sheets

(56) References Cited

U.S. PATENT DOCUMENTS

| | | | | |
|---|---|---|---|---|
| 10,447,458 B2* | 10/2019 | Chang | ................... | H04L 5/001 |
| 10,560,139 B2* | 2/2020 | Brunel | ................. | H04B 17/11 |
| 10,938,437 B2* | 3/2021 | Liu | ........................ | H04B 1/52 |
| 2002/0090974 A1* | 7/2002 | Hagn | ...................... | H04B 1/48 |
| | | | | 455/552.1 |
| 2011/0249599 A1* | 10/2011 | Kaluzni | ............. | H04B 1/0057 |
| | | | | 370/281 |
| 2011/0279193 A1 | 11/2011 | Furutani | | |
| 2014/0307836 A1* | 10/2014 | Khlat | ..................... | H04B 1/04 |
| | | | | 375/343 |
| 2014/0321339 A1* | 10/2014 | Pehlke | ................ | H04B 1/006 |
| | | | | 370/281 |
| 2017/0141801 A1* | 5/2017 | Watanabe | ............... | H03H 9/64 |
| 2018/0131500 A1 | 5/2018 | Pehlke | | |

OTHER PUBLICATIONS

TQQ1030 Band 30 BAW Duplexer Datasheet, Qorvo (Year: 2016).*
QPC1217Q General Purpose DPDT Transfer Switch Datasheet, Qorvo (Year: 2016).*
MAX395 Serially Controlled, Low-Voltage, 8-Channel SPST Switch, Maxim Integrated Products, Nov. 1995 (Year: 1995).*
"Low Capacitance, Triple/Quad SPDT ±15 V/+12 V iCMOS Switches ADG1233/ADG1234" by Analog Devices, located at https://www.mouser.com/datasheet/2/609/ADG1233_1234-1502869.pdf (Year: 2016).*

* cited by examiner

RADIO-FREQUENCY MODULE AND COMMUNICATION DEVICE

This application claims priority from Japanese Patent Application No. 2018-237324 filed on Dec. 19, 2018. The content of this application is incorporated herein by reference in its entirety.

BACKGROUND

The present disclosure relates to a radio-frequency module and a communication device. There is a demand that current communication services adopt multi-band and multi-mode features for multi-band transmission to enable high-capacity and high-accuracy communications.

US Patent Application Publication No. 2018/0131500 discloses a circuit configuration of a radio-frequency module that enables transmission and reception in long term evolution (LTE) Band 28A, transmission and reception in LTE Band 28B, and reception in LTE Band 29. In view of the fact that the reception band of Band 29 is included in the transmission band of Band 28A, the radio-frequency module has a circuit configuration in which a receiving filter for Band 29 also doubles as a transmitting filter for Band 28A. The radio-frequency module includes: a duplexer for operation in Band 28A; a duplexer for operation in Band 28B; a first switch connected to an antenna to switch between the two duplexers; and a second switch disposed between the two duplexers and an amplifier circuit to switch between a transmission path for Band 28A and a reception path for Band 29. The circuit configuration omits a filter dedicated to operation in Band 29 accordingly.

Despite the omission of such a filter dedicated to operation in Band 29, the radio-frequency module disclosed in US Patent Application Publication No. 2018/0131500 is large because the first switch disposed between the antenna and the duplexers and the second switch disposed between the duplexers and the amplifier circuit are provided separately from each other.

BRIEF SUMMARY

The present disclosure provides a radio-frequency module and a communication device that have a simplified and compact circuit configuration and are capable of transmitting radio-frequency signals in a plurality of communication bands where there is an inclusion relation between the transmission band of one communication band and the reception band of another communication band.

According to embodiments of the present disclosure, a radio-frequency module transmits radio-frequency signals in a first communication band, radio-frequency signals in a second communication band, and radio-frequency signals in a third communication band, the first to third communication bands being different frequency bands. A transmission band of the second communication band includes a reception band of the third communication band. The radio-frequency module includes: a common input/output terminal; a first input terminal to which radio-frequency transmission signals are input; a first output terminal from which radio-frequency reception signals in the first communication band are output; a second output terminal from which radio-frequency reception signals in the second communication band are output; a third output terminal from which radio-frequency reception signals in the third communication band are output; a first transmitting filter whose pass band is a transmission band of the first communication band; a first receiving filter whose pass band is a reception band of the first communication band; a second transmitting filter whose pass band is the transmission band of the second communication band; a second receiving filter whose pass band is a reception band of the second communication band; a switch including a first common terminal, a second common terminal, a first selection terminal, a second selection terminal, a third selection terminal, a fourth selection terminal, and a fifth selection terminal and configured as one chip. The first common terminal is connected to the common input/output terminal. The second common terminal is connected to the first input terminal. An output terminal of the first transmitting filter and an input terminal of the first receiving filter are connected to the first selection terminal. An output terminal of the second transmitting filter and an input terminal of the second receiving filter are connected to the second selection terminal. An input terminal of the first transmitting filter is connected to the third selection terminal. An input terminal of the second transmitting filter is connected to the fourth selection terminal. An output terminal of the first receiving filter is connected to the first output terminal. An output terminal of the second receiving filter is connected to the second output terminal. The fifth selection terminal is connected to the third output terminal.

Other features, elements, characteristics, and advantages of the present disclosure will become more apparent from the following detailed description of embodiments of the present disclosure with reference to the attached drawings.

and

Figure 8:
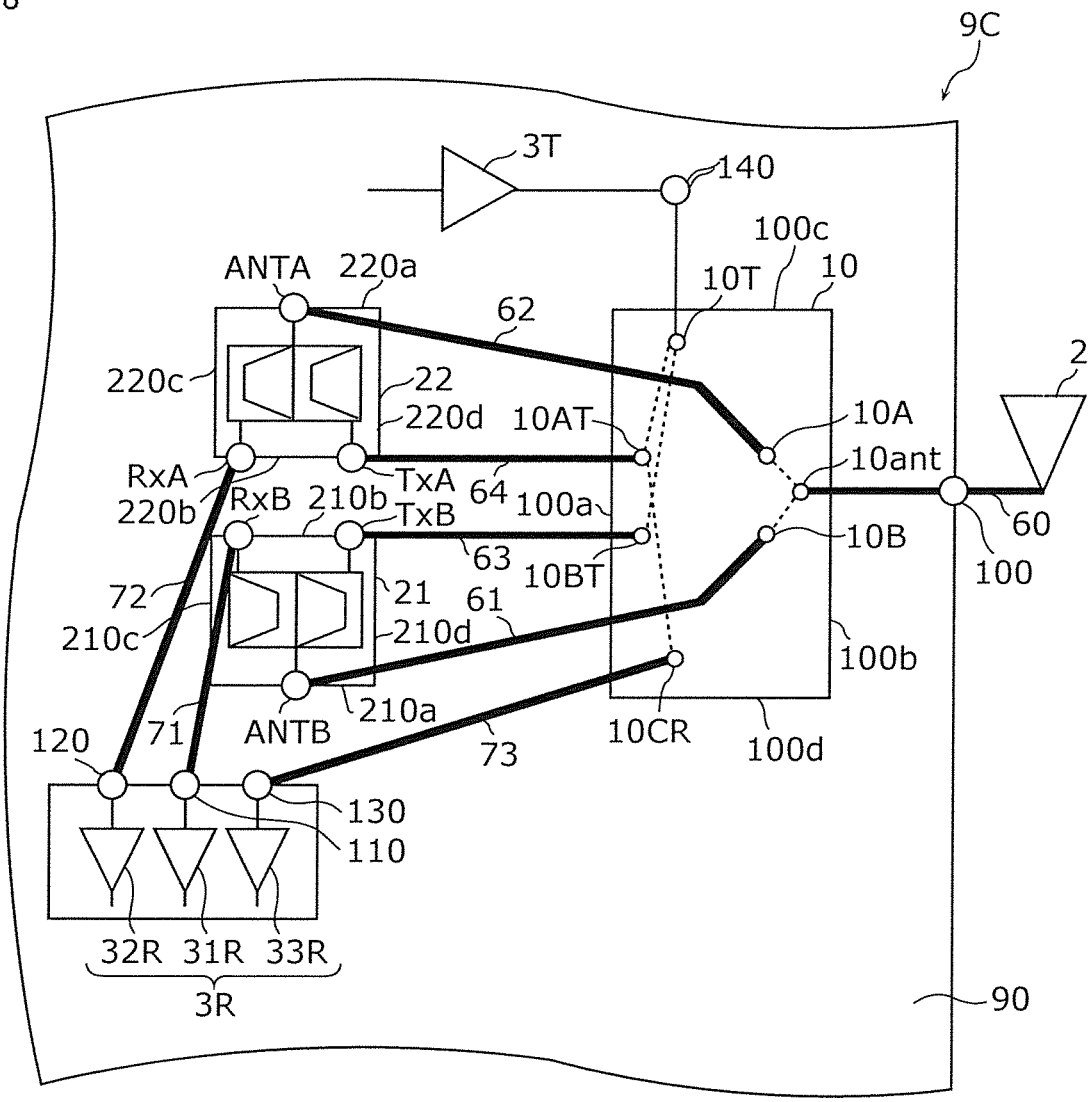

FIG. 8 is a schematic diagram illustrating a layout of the radio-frequency module according to Example 4 viewed in plan.

DETAILED DESCRIPTION

Hereinafter, an embodiment of the present disclosure will be described in detail with reference to the drawings. The following embodiment and the following examples and modifications of the embodiment are generally or specifically illustrative. Details such as values, shapes, materials, constituent components, and arrangements and connection patterns of the constituent components in the following embodiment, examples, and modifications are provided merely as examples and should not be construed as limiting the present disclosure. Of the constituent components in the following embodiment, examples, and modifications, constituent components that are not mentioned in independent claims are described as freely selected constituent components. The sizes and the relative proportions of the constituent components illustrated in the drawings are not necessarily to scale.

Regarding elements (components) X, Y, and Z mounted on a substrate in the following embodiment, the expression "when the substrate is viewed in plan, Z is disposed between X and Y" herein means that a line connecting a freely selected point in a region of X projected onto a substrate surface when the substrate is viewed in plan to a freely selected point in a region of Y projected onto the substrate surface when the substrate is viewed in plan intersects at least part of a region of Z projected onto the substrate surface when the substrate is viewed in plan.

Embodiment

1. Circuit Configuration of Radio-Frequency Module 1 and Communication Device 6

Figure 1:
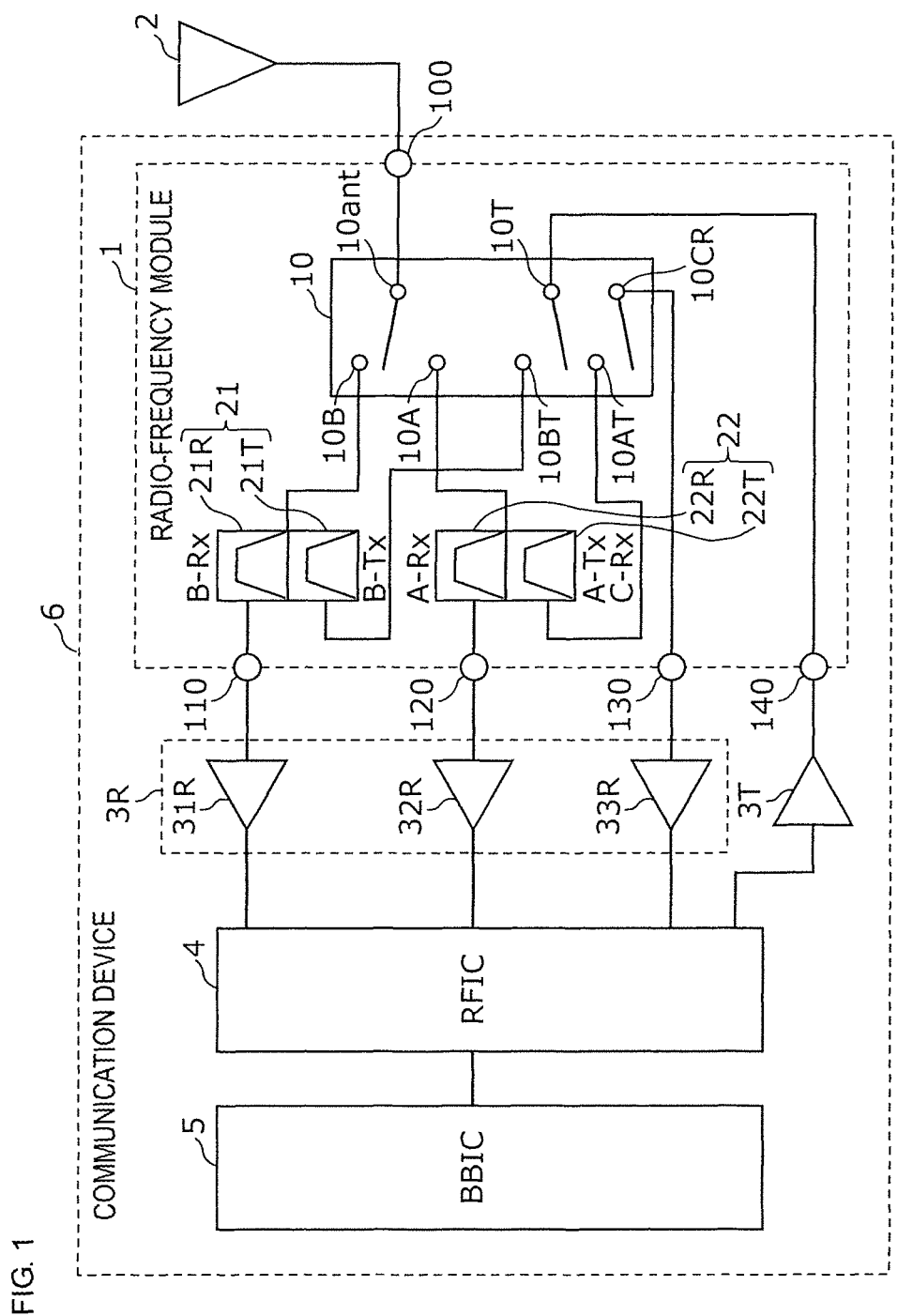
FIG. 1 is a circuit configuration diagram of a radio-frequency module and a communication device according to an embodiment of the present disclosure.

FIG. 1 is a circuit configuration diagram of a radio-frequency module 1 and a communication device 6 according to the present embodiment. As illustrated in FIG. 1, the communication device 6 includes the radio-frequency module 1, a reception amplifier circuit 3R, a transmission amplifier circuit 3T, a radio-frequency integrated circuit (RFIC) 4, and a baseband integrated circuit (BBIC) 5.

The radio-frequency module 1 and the communication device 6 according to the present embodiment transmit radio-frequency signals in a band B (a first communication band), radio-frequency signals in a band A (a second communication band), and radio-frequency signals in a band C (a third communication band), the bands A, B, and C being different frequency bands. The transmission band of the band A includes the reception band of the band C.

The RFIC 4 is an RF signal processing circuit that processes radio-frequency signals transmitted or received via an antenna 2. Specifically, the RFIC 4 performs signal processing such as down-conversion on radio-frequency signals input through a reception path of the radio-frequency module 1 and outputs reception signals generated by the signal processing to, for example, a baseband signal processing circuit (not illustrated). The RFIC 4 performs signal processing such as up-conversion on transmission signals input from the BBIC 5 and outputs radio-frequency signals generated by the signal processing to a transmission path of the radio-frequency module 1.

The RFIC 4 also functions as a control unit that controls, in accordance with the communication band (frequency band) in use, connections in a switch 10 included in the radio-frequency module 1. Specifically, the RFIC 4 switches, by using control signals (not illustrated), between connections in the switch 10 included in the radio-frequency module 1. The control unit may be disposed outside the RFIC 4. Specifically, the control unit is disposed, for example, in the radio-frequency module 1 or the BBIC 5.

The reception amplifier circuit 3R includes reception amplifiers 31R, 32R, and 33R. The reception amplifier 31R can amplify reception signals in the band B (the first communication band) output by the radio-frequency module 1 and then outputs the amplified reception signals to the RFIC 4. The reception amplifier 32R can amplify reception signals in the band A (the second communication band) output by the radio-frequency module 1 and then outputs the amplified reception signals to the RFIC 4. The reception amplifier 33R can amplify reception signals in the band C (the third communication band) output by the radio-frequency module 1 and then outputs the amplified reception signals to the RFIC 4.

It is not always required that the reception amplifier circuit 3R include three reception amplifiers, namely, the reception amplifiers 31R, 32R, and 33R. Alternatively, the reception amplifier circuit 3R may include one reception amplifier. With this configuration, the reception amplifier offers the characteristics of amplifying reception signals in the band A, reception signals in the band B, and reception signals in the band C. This configuration may also include a switch disposed between the reception amplifier and the radio-frequency module 1 to switch between the state in which the reception amplifier is connected to a signal path in the radio-frequency module 1 through which radio-frequency signals in the band A are transmitted, the state in which the reception amplifier is connected to a signal path in the radio-frequency module 1 through which radio-frequency signals in the band B are transmitted, and the state in which the reception amplifier is connected to a signal path in the radio-frequency module 1 through which radio-frequency signals in the band C are transmitted.

The transmission amplifier circuit 3T is a transmission amplifier that amplify radio-frequency signals in the band A and radio-frequency signals in the band B and then outputs the amplified transmission signals to the radio-frequency module 1.

It is not always required that the transmission amplifier circuit 3T include one transmission amplifier. Alternatively, the transmission amplifier circuit 3T may include two transmission amplifiers. With this configuration, one transmission amplifier offers the characteristics of amplifying radio-frequency signals in the band A and the other transmission amplifier offers the characteristics of amplifying radio-frequency signals in the band B.

The antenna 2 is connected to a common input/output terminal 100 of the radio-frequency module 1 to radiate radio-frequency signals output by the radio-frequency module 1 and to enable the radio-frequency module 1 to receive radio-frequency signals from the outside. The antenna 2 may be included in the communication device 6 according to the present embodiment.

The following describes, in detail, the configuration of the radio-frequency module 1.

As illustrated in FIG. 1, the radio-frequency module 1 includes the common input/output terminal 100, a transmission input terminal 140 (a first input terminal), a reception output terminal 110 (a first output terminal), a reception output terminal 120 (a second output terminal), a reception output terminal 130 (a third output terminal), duplexers 21 and 22, and the switch 10.

The radio-frequency module 1 according to the present embodiment is capable of transmitting transmission signals and reception signals in the band A (the second communication band), transmission signals and reception signals in the band B (the first communication band), and reception signals in the band C (the third communication band).

The switch 10 includes a common terminal 10ant (a first common terminal), a common terminal 10T (a second common terminal), a selection terminal 10B (a first selection terminal), a selection terminal 10A (a second selection terminal), a selection terminal 10BT (a third selection terminal), a selection terminal 10AT (a fourth selection terminal), and a selection terminal 10CR (a fifth selection terminal). The switch 10 is configured as one chip and may be included in, for example, one switching IC.

The transmission input terminal 140 is the first input terminal connected to an output terminal of the transmission amplifier circuit 3T, and radio-frequency transmission signals output by the transmission amplifier circuit 3T are input to the first input terminal.

The reception output terminal 110 is a first output terminal connected to an input terminal of the reception amplifier 31R, and radio-frequency reception signals in the band B (the first communication band) are output from the first output terminal to the reception amplifier 31R. The reception output terminal 120 is a second output terminal connected to an input terminal of the reception amplifier 32R, and radio-frequency reception signals in the band A (the second communication band) are output from the second output terminal to the reception amplifier 32R. The reception output terminal 130 is a third output terminal connected to an input terminal of the reception amplifier 33R, and radio-frequency reception signals in the band C (the third communication band) are output from the third output terminal to the reception amplifier 33R.

The duplexer 21 is a first duplexer including a transmitting filter 21T (a first transmitting filter) and a receiving filter 21R (a first receiving filter) to transmit and receive radio-frequency signals in the band B. The duplexer 21 includes a first antenna terminal (not illustrated) for shared use as an output terminal of the transmitting filter 21T and an input terminal of the receiving filter 21R, a first transmission terminal (not illustrated) as an input terminal of the transmitting filter 21T, and a first reception terminal (not illustrated) as an output terminal of the receiving filter 21R.

The transmitting filter 21T is a first transmitting filter whose pass band is the transmission band of the band B. The receiving filter 21R is a first receiving filter whose pass band is the reception band of the band B.

The duplexer 22 is a second duplexer including a transmitting filter 22T (a second transmitting filter) and a receiving filter 22R (a second receiving filter) to transmit and receive radio-frequency signals in the band A. The duplexer 22 includes a second antenna terminal (not illustrated) for shared use as an output terminal of the transmitting filter 22T and an input terminal of the receiving filter 22R, a second transmission terminal (not illustrated) as an input terminal of the transmitting filter 22T, and a second reception terminal (not illustrated) as an output terminal of the receiving filter 22R.

The transmitting filter 22T is a second transmitting filter whose pass band is the transmission band of the band A. The receiving filter 22R is a second receiving filter whose pass band is the reception band of the band A.

The common terminal 10ant is connected to the common input/output terminal 100. The common terminal 10T is connected to the transmission input terminal 140.

The first antenna terminal of the duplexer 21 is connected to the selection terminal 10B. The first transmission terminal of the duplexer 21 is connected to selection terminal 10BT. The first reception terminal of the duplexer 21 is connected to the reception output terminal 110.

The second antenna terminal of the duplexer 22 is connected to the selection terminal 10A. The second transmission terminal of the duplexer 22 is connected to selection terminal 10AT. The second reception terminal of the duplexer 22 is connected to the reception output terminal 120.

The selection terminal 10CR is connected to the reception output terminal 130.

In such a triple-band transmission system for transmitting radio-frequency signals in the three different bands, namely, the bands A, B, and C where the transmission band of the band A includes the reception band of the band C, the configuration above enables the transmitting filter for the transmission band of the band A to double as the receiving filter for the reception band of the band C. Furthermore, the switch that switches between the state in which the common input/output terminal 100 is connected to the duplexer 21 and the state in which the common input/output terminal 100 is connected to the duplexer 22 and the switch that switches between the state in which the transmitting filter 22T is connected to the reception output terminal 130 and the state in which the transmitting filter 22T is connected to the transmission input terminal 140 are configured as one chip. These features are conducive to providing the radio-frequency module 1 and the communication device 6 that have a simplified and compact circuit configuration and are capable of transmitting radio-frequency signals in a plurality of communication bands where there is an inclusion relation between the transmission band of one communication band and the reception band of another communication band.

Figure 2:
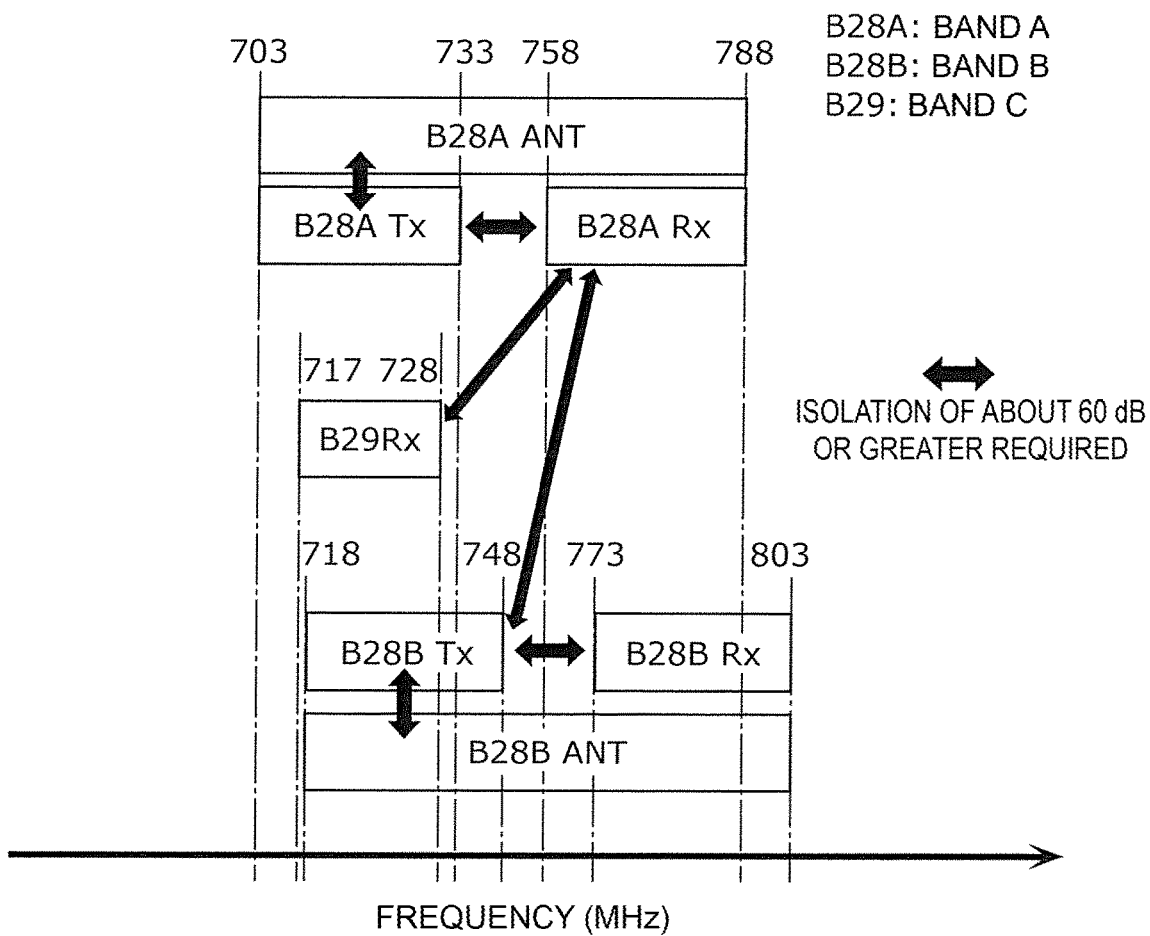
FIG. 2 illustrates exemplary frequency allocation in communication bands available for use by the radio-frequency module according to an embodiment of the present disclosure.

FIG. 2 illustrates exemplary frequency allocation in the communication bands available for use by the radio-frequency module 1 according to the present embodiment. In the present embodiment, the band A (the second communication band) is, for example, LTE Band 28A (transmission band: 703 to 733 MHz; reception band: 758 to 788 MHz). The band B (the first communication band) is, for example, LTE Band 28B (transmission band: 718 to 748 MHz; reception band: 773 to 803 MHz). The band C (the third communication band) is, for example, LTE Band 29 (reception band: 717 to 728 MHz).

As illustrated in FIG. 2, Band 28A (the band A) and Band 28B (the band B) are assigned respective transmission bands (Tx) and respective reception bands (Rx). Band 29 (the band C) is assigned a reception band (Rx) alone. The transmission band of the band A (Band 28A) includes the reception band of the band C (Band 29).

Figure 3:
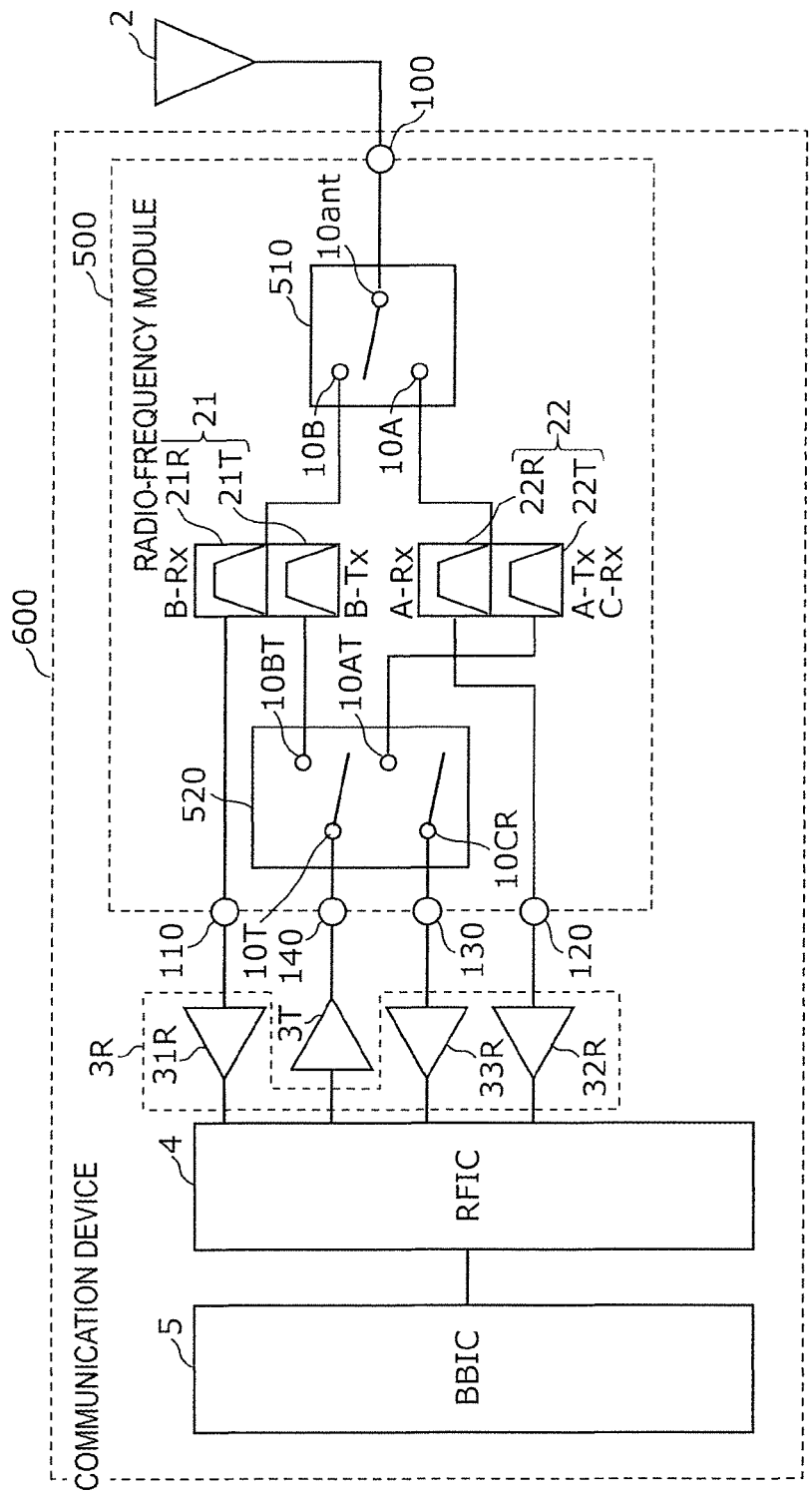
FIG. 3 is a circuit configuration diagram of a radio-frequency module and a communication device according to Comparative Example.

2. Circuit Configuration of Radio-Frequency Module 500 and Communication Device 600 According to Comparative Example FIG. 3 is a circuit configuration diagram of a radio-frequency module 500 and a communication device 600 according to Comparative Example. As illustrated in FIG. 3, the communication device 600 according to Comparative Example includes the radio-frequency module 500, the reception amplifier circuit 3R, the transmission amplifier circuit 3T, the RFIC 4, and the BBIC 5. As with the radio-frequency module 1 and the communication device 6 according to the present embodiment, the radio-frequency module 500 and the communication device 600 according to Comparative Example transmit radio-frequency signals in the band B (the first communication band), the band A (the second communication band), and the band C (the third communication band), the bands A, B, and C being different frequency bands. The transmission band of the band A includes the reception band of the band C.

The radio-frequency module 500 and the communication device 600 according to Comparative Example differ from the radio-frequency module 1 and the communication device 6 according to the present embodiment in that the radio-frequency module 500 includes two switches. Configurations common to the radio-frequency module 500 and the communication device 600 according to Comparative Example and the radio-frequency module 1 and the communication device 6 according to the present embodiment will be omitted from the following description, which will be given while focusing on distinctive features of Comparative Example.

The radio-frequency module 500 includes the common input/output terminal 100, the transmission input terminal 140, the reception output terminals 110, 120, and 130, the duplexers 21 and 22, and switches 510 and 520. The radio-frequency module 500 according to Comparative Example is capable of transmitting transmission signals and reception signals in the band A, transmission signals and reception signals in the band B, and reception signals in the band C.

The switch 510 includes the common terminal 10ant and the selection terminals 10A and 10B. The switch 520 includes the common terminal 10T and the selection terminals 10AT, 10BT and 10CR. The radio-frequency module 500 includes two switches, namely, the switches 510 and 520.

In such a triple-band transmission system for transmitting radio-frequency signals in the three different bands, namely, the bands A, B, and C where the transmission band of the band A includes the reception band of the band C, the configuration of the radio-frequency module 500 and the communication device 600 according to Comparative Example enables the transmitting filter for the transmission band of the band A to double as the receiving filter for the reception band of the band C. Meanwhile, the switch 510 that switches between the state in which the common input/output terminal 100 is connected to the duplexer 21 and the state in which the common input/output terminal 100 is connected to the duplexer 22 and the switch 520 that switches between the state in which the transmitting filter 22T is connected to the reception output terminal 130 and the state in which the transmitting filter 22T is connected to the transmission input terminal 140 are configured as separate chips. Although this configuration enables transmission of radio-frequency signals in a plurality of communication bands where there is an inclusion relation between the transmission band of one communication band and the reception band of another communication band, the switching circuitry has an increased size.

3. State of Circuitry of Radio-Frequency Module 1 Associated with Switching Operation of Switch 10

Figure 4A:
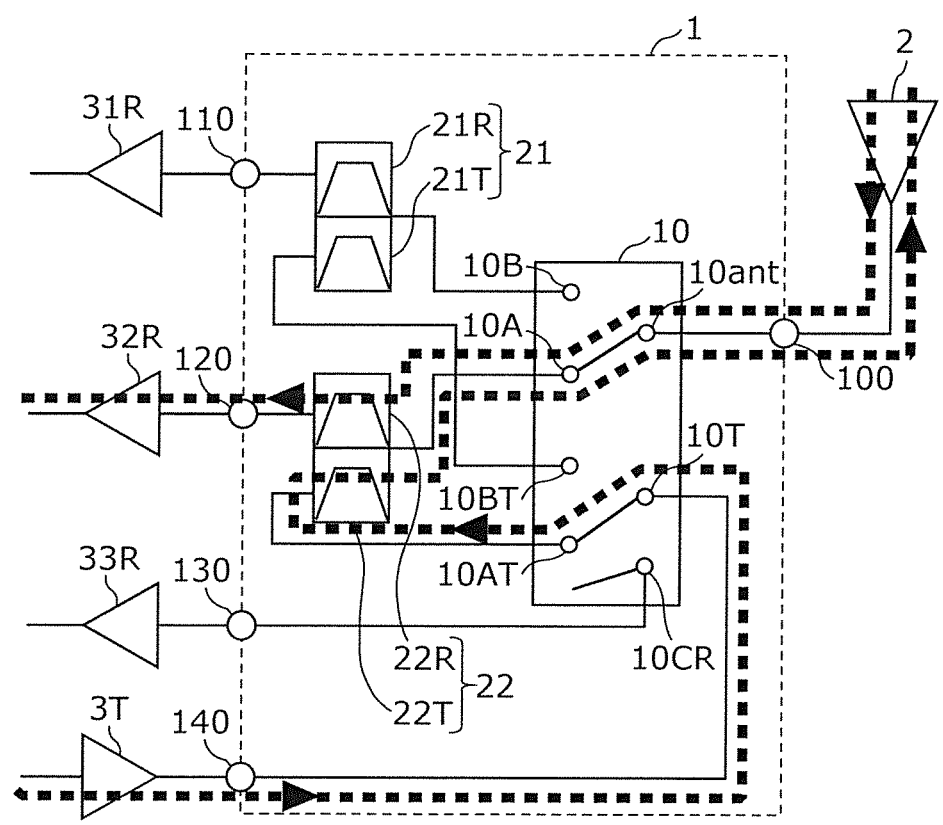
FIG. 4A illustrates a state of the circuitry of the radio-frequency module transmitting and receiving radio-frequency signals in a band A according to an embodiment of the present disclosure.

FIG. 4A illustrates a state of the circuitry of the radio-frequency module 1 transmitting and receiving radio-frequency signals in the band A (the second communication band) according to the present embodiment. For simultaneous transmission of transmission signals and reception signals in the band A, the switch 10 is set, as illustrated in FIG. 4A, to the state in which the common terminal 10ant is electrically connected to the selection terminal 10A and the common terminal 10T is electrically connected to the selection terminal 10AT. In this state, transmission signals in the band A flow through the transmission amplifier circuit 3T, the transmission input terminal 140, the common terminal 10T, the selection terminal 10AT, the transmitting filter 22T, the selection terminal 10A, and the common terminal 10ant and are then output from the common input/output terminal 100 to the antenna 2. Reception signals in the band A flow from the antenna 2 through the common input/output terminal 100, the common terminal 10ant, the selection terminal 10A, and the receiving filter 22R and are then output from the reception output terminal 120 to the reception amplifier 32R.

Figure 4B:
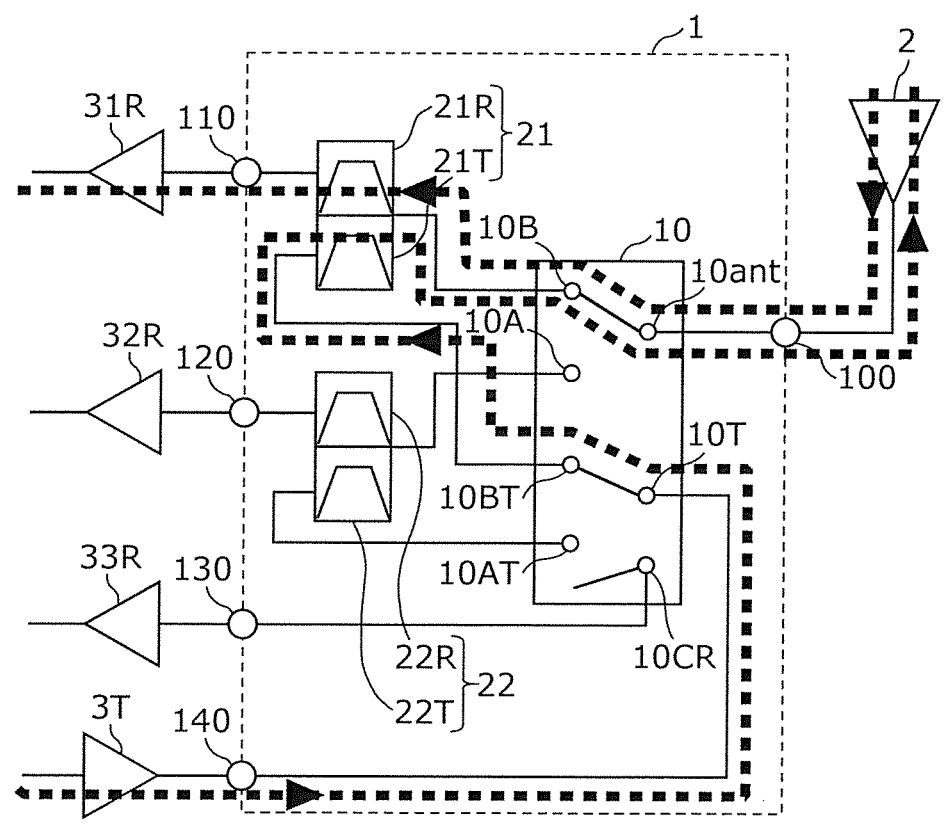
FIG. 4B illustrates a state of the circuitry of the radio-frequency module transmitting and receiving radio-frequency signals in a band B according to an embodiment of the present disclosure.

FIG. 4B illustrates a state of the circuitry of the radio-frequency module 1 transmitting and receiving radio-frequency signals in the band B (the first communication band) according to the present embodiment. For simultaneous transmission of transmission signals and reception signals in the band B, the switch 10 is set, as illustrated in FIG. 4B, to the state in which the common terminal 10ant is electrically connected to the selection terminal 10B and the common terminal 10T is electrically connected to the selection terminal 10BT. In this state, transmission signals in the band B flow through the transmission amplifier circuit 3T, the transmission input terminal 140, the common terminal 10T, the selection terminal 10BT, the transmitting filter 21T, the selection terminal 10B, and the common terminal 10ant and are then output from the common input/output terminal 100 to the antenna 2. Reception signals in the band B flow from the antenna 2 through the common input/output terminal 100, the common terminal 10ant, the selection terminal 10B, and the receiving filter 21R and are then output from the reception output terminal 110 to the reception amplifier 31R.

Figure 4C:
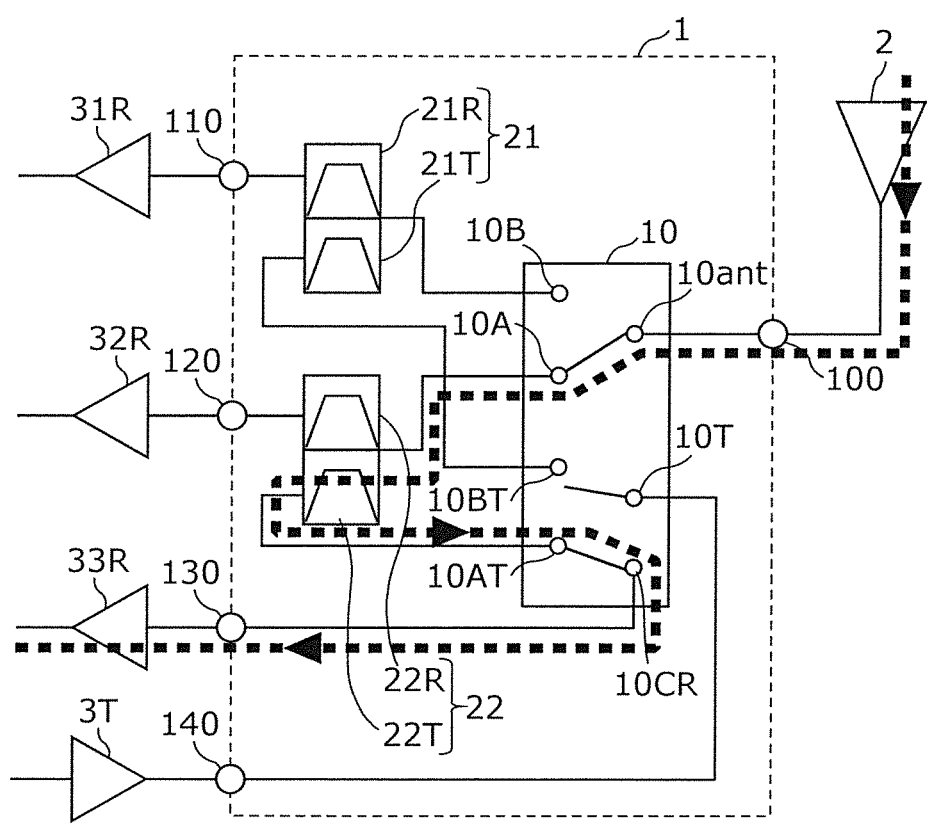
FIG. 4C illustrates a state of the circuitry of the radio-frequency module transmitting and receiving radio-frequency signals in a band C according to an embodiment of the present disclosure.

FIG. 4C illustrates a state of the circuitry of the radio-frequency module 1 receiving radio-frequency signals in the band C (the third communication band) according to the present embodiment. For transmission of reception signals in the band C, the switch 10 is set, as illustrated in FIG. 4C, to the state in which the common terminal 10ant is electrically connected to the selection terminal 10A and the selection terminal 10AT is electrically connected to the selection terminal 10CR. In this state, reception signals in the band C flow from the antenna 2 through the common input/output terminal 100, the common terminal 10ant, the selection terminal 10A, the transmitting filter 22T, the selection terminal 10AT, and the selection terminal 10CR and are then output from the reception output terminal 130 to the reception amplifier 33R.

This switching operation enables one switch 10 to switch between the state in which the common input/output terminal 100 is connected to the duplexer 21 and the state in which the common input/output terminal 100 is connected to the duplexer 22 and to switch between the state in which the transmitting filter 22T is connected to the reception output terminal 130 and the state in which the transmitting filter 22T is connected to the transmission input terminal 140. This is conducive to providing the radio-frequency module 1 having a simplified and compact circuit configuration and being capable of transmitting radio-frequency signals in a plurality of communication bands where there is an inclusion relation between the transmission band of one communication band and the reception band of another communication band.

The control for switching between presence and absence of the electrical connection between the individual terminals of the switch 10 may be performed by a control unit included in the RFIC 4 or by a control unit included in the radio-frequency module 1.

Alternatively, the control for switching between presence and absence of the electrical connection between the individual terminals of the switch 10 may be performed in such a manner that a control circuit included in the radio-frequency module 1 receives an instruction from the control unit included in the RFIC 4 and sends a control signal to the switch 10. In this case, the switch 10 and the control circuit may be included in one switching IC. This configuration enables shortening of the wiring forming connections between the individual terminals of the switch 10 and shortening of the control wiring extending from the control circuit to the switch 10. Thus, the radio-frequency module 1 having a further reduced size and transmission loss is realized.

The switching IC is configured as, for example, a complementary metal oxide semiconductor (CMOS). Such a switching IC is produced inexpensively. The switching IC may be formed from GaAs.

The radio-frequency module 1 is also capable of implementing: (a) carrier aggregation (hereinafter referred to as CA) for simultaneously transmitting transmission signals in the band A and transmission signals in the band B (two uplinks); (b) CA for simultaneously transmitting transmission signals in the band B and receiving reception signals in the band C (one uplink, one downlink); (c) CA for simultaneously receiving reception signals in the band A and reception signals in the band B (two downlinks); (d) CA for simultaneously receiving reception signals in the band B and reception signals in the band C (two downlinks); (e) CA for simultaneously transmitting transmission signals in the band A, receiving reception signals in the band A, transmitting transmission signals in the band B, and receiving reception signals in the band B (two uplinks, two downlinks); and (f) CA for simultaneously transmitting transmission signals in the band B, receiving reception signals in the band B, and receiving reception signals in the band C (one uplink, two downlinks). When at least one of (a) to (f) is implemented, the switch 10 functions as a "multi-connection switch". That is, the switch 10 is configured in such a manner that each of the common terminals 10*ant* and 10T is capable of being simultaneously connected to more than one selection terminals.

4. Layout of Circuit Elements of Radio-Frequency Module

For low-loss transmission of radio-frequency signals in each band, the radio-frequency module 1 according to the present embodiment desirably ensures that, as illustrated in FIG. 2, an isolation of about 60 dB or more is provided (1) between the Tx and the Rx of the band A (Band 28A); (2) between the antenna terminal and the Tx of the band A (Band 28A); (3) between the Tx and the Rx of the band B (Band 28B); (4) between the antenna terminal and the Tx of the band B (Band 28B); (5) between the Tx of the band B (Band 28B) and the Rx of the band A (Band 28A); and (6) between the Rx of the band C (Band 29) and the Rx of the band A (Band 28A). To provide an isolation of about 60 dB or more, it is desired that traces for forming connections between the common input/output terminal 100 and each of the duplexers 21 and 22 via the switch 10 intersect no other traces.

Figure 5:
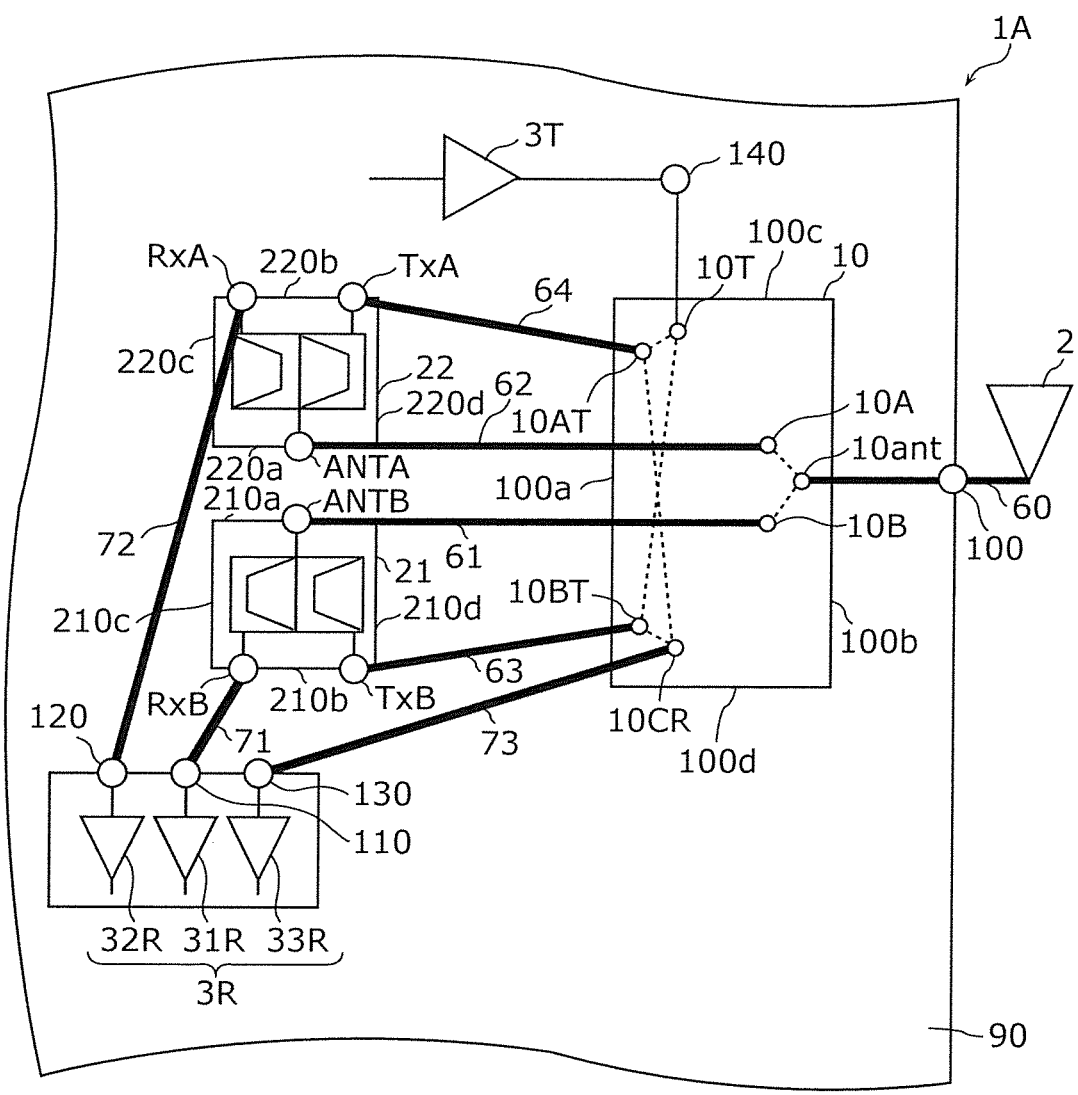
FIG. 5 is a schematic diagram illustrating a layout of the radio-frequency module according to Example 1 viewed in plan.

FIG. 5 is a schematic diagram illustrating a layout of a radio-frequency module 1A according to Example 1 viewed in plan. The layout of the circuit elements of the radio-frequency module 1 according to the present embodiment is embodied in the radio-frequency module 1A illustrated in FIG. 5. As illustrated in FIG. 5, the constituent components of the radio-frequency module 1A such as the common input/output terminal 100, the transmission input terminal 140, the reception output terminals 110 to 130, the duplexers 21 and 22, and the switch 10 are mounted on a mounting substrate 90. In Example 1, the reception amplifier circuit 3R is also mounted on the mounting substrate 90. The antenna 2 is connected to the common input/output terminal 100 on the mounting substrate 90. Alternatively, the antenna 2 may be mounted on the mounting substrate 90.

In Example 1, each of the duplexers 21 and 22, the switch 10, and the reception amplifier circuit 3R is disposed on a first main surface or a second main surface of the mounting substrate 90, with the first and second main surfaces opposite to each other. The mounting substrate 90 is a multilayer substrate including a plurality of layers stacked on top of one another and may be, for example, a ceramic multilayer substrate or a PCB substrate.

FIG. 5 is a schematic diagram of the mounting substrate 90 seen through and viewed in plan, illustrating a planar layout of components on the mounting substrate 90 including the circuit elements constituting the radio-frequency module 1A and traces 60 to 64 and 71 to 73, which will be described later. Referring to FIG. 5, a terminal ANTB is a first antenna terminal of the duplexer 21, a terminal TxB is a first transmission terminal of the duplexer 21, and a terminal RxB is a first reception terminal of the duplexer 21. Referring to FIG. 5, a terminal ANTA is a second antenna terminal of the duplexer 22, a terminal TxA is a second transmission terminal of the duplexer 22, and a terminal RxA is a second reception terminal of the duplexer 22. Referring to FIG. 5, the reception output terminal 110 is the input terminal of the reception amplifier 31R, the reception output terminal 120 is the input terminal of the reception amplifier 32R, and the reception output terminal 130 is the input terminal of the reception amplifier 33R. That is, the reception output terminals 110 to 130 are input terminals of the reception amplifier circuit 3R.

As illustrated in FIG. 5, an electrically conductive trace 60 links the common terminal 10*ant* to the antenna 2 via the common input/output terminal 100. An electrically conductive trace 61 links the terminal ANTB to the selection terminal 10B, and an electrically conductive trace 62 links the terminal ANTA to the selection terminal 10A. An electrically conductive trace 63 links the terminal TxB to the selection terminal 10BT, and an electrically conductive trace 64 links the terminal TxA to the selection terminal 10AT. An electrically conductive trace 71 links the reception output terminal 110 to the terminal RxB, an electrically conductive trace 72 links the reception output terminal 120 to the terminal RxA, and an electrically conductive trace 73 links the reception output terminal 130 to the selection terminal 10CR.

Each of the traces 60 to 64 and traces 71 to 73 is formed on the first surface of the mounting substrate 90, on the second surface of the mounting substrate 90, and in an inner layer of the mounting substrate 90.

To reduce the transmission loss of the radio-frequency module 1A, the traces 60 to 64 and the traces 71 to 73 are straight as illustrated in FIG. 5. Alternatively, these traces may be curved.

With sides 210*a*, 210*b*, 210*c*, and 210*d* defining the outer periphery of the duplexer 21, the terminal ANTB is disposed adjacent to the side 210*a* (a first side) and the terminals TxB and RxB are disposed adjacent to the side 210*b* when the mounting substrate 90 is viewed in plan. Alternatively, the terminal TxB may be disposed adjacent to the side 210*d* and the terminal RxB may be disposed adjacent to the side 210*c*. It is desired that the terminal ANTB is disposed as far away from the terminals TxB and RxB as possible and that the terminals TxB and RxB are disposed as far away from each other as possible. This layout of the terminals ANTB, TxB, and RxB of the duplexer 21 enables optimization of the isolation between the antenna terminal, the transmission terminal, and the reception terminal of the duplexer 21.

With sides 220a, 220b, 220c, and 220d defining the outer periphery of the duplexer 22, the terminal ANTA is disposed adjacent to the side 220a (a second side) and the terminals TxA and RxA are disposed adjacent to the side 220b when the mounting substrate 90 is viewed in plan. Alternatively, the terminal TxA may be disposed adjacent to the side 220d and the terminal RxA may be disposed adjacent to the side 220c. It is desired that the terminal ANTA is disposed as far away from the terminals TxA and RxA as possible and that the terminals TxA and RxA are disposed as far away from each other as possible. This layout of the terminals ANTA, TxA, and RxA of the duplexer 22 enables optimization of the isolation between the antenna terminal, the transmission terminal, and the reception terminal of the duplexer 22.

The side 210a (the first side) of the duplexer 21 and the side 220a (the second side) of the duplexer 22 are disposed in such a manner that the sides other than the side 210a of the duplexer 21 and the sides other than the side 220a of the duplexer 22 are not located between the side 210a and the side 220a and in such a manner that the switch 10, the transmission input terminal 140, and the reception output terminals 110 to 130 are not located between the side 210a and the side 220a.

In Example 1, the side 210a and the side 220a are opposite to each other. That is, the terminal ANTA and the terminal ANTB are disposed adjacent to each other with no other terminals interposed therebetween.

With sides 100a, 100b, 100c, and 100d defining the outer periphery of the switch 10, the side 100a (a third side) and the duplexers 21 and 22 are disposed in such a manner that the sides other than the side 100a of the switch 10 are not located between the switch 10 and each of the duplexers 21 and 22 and in such a manner that the transmission input terminal 140 and the reception output terminals 110 to 130 are not located between the switch 10 and each of the duplexers 21 and 22.

The common terminal 10T, the selection terminal 10AT, the selection terminal 10BT, and the selection terminal 10CR in the switch 10 are disposed closer to the side 100a than to the center point of the switch 10, and the common terminal 10T, the selection terminal 10AT, the selection terminal 10BT, and the selection terminal 10CR are disposed along the side 100a in the stated order in such a direction that an imaginary line (the trace 63 in FIG. 5) linking the terminal TxB to the selection terminal 10BT does not intersect an imaginary line (the trace 64 in FIG. 5) linking the terminal TxA to the selection terminal 10AT.

This configuration enables one switch 10 to switch between the state in which the common input/output terminal 100 is connected to the duplexer 21 and the state in which the common input/output terminal 100 is connected to the duplexer 22 and to switch between the state in which the transmitting filter 22T is connected to the reception output terminal 130 and the state in which the transmitting filter 22T is connected to the transmission input terminal 140. This is conducive to providing the radio-frequency module 1A having a simplified and compact circuit configuration and being capable of transmitting radio-frequency signals in a plurality of communication bands where there is an inclusion relation between the transmission band of one communication band and the reception band of another communication band.

In the layout above, the trace 61 connected to the terminal ANTB and the trace 62 connected to the terminal ANTA intersect the side 100a, lie between the selection terminal 10AT and the selection terminal 10BT, and are connected respectively to the selection terminal 10B and the selection terminal 10A. Thus, the trace 64 linking the terminal TxA to the selection terminal 10AT, the trace 62 linking the terminal ANTA to the selection terminal 10A, the trace 61 linking the terminal ANTB to the selection terminal 10B, and the trace 63 linking the terminal TxB to the selection terminal 10BT lie side by side in the stated order and do not intersect one another.

That is, the traces 61 to 64 through which high-power radio-frequency signals flow neither intersect one another nor intersect other traces, and the aforementioned requirements (1) to (5) are satisfied accordingly.

Since the common terminal 10T, the selection terminal 10AT, the selection terminal 10BT, and the selection terminal 10CR lie side by side in the stated order, the trace 73 linking the reception output terminal 130 to the selection terminal 10CR is closer to the outer side portion than the trace 63 is, with the trace 63 being closer to the outer side portion than the traces 61, 62, and 64 are. This layout eliminates or reduces the possibility that the trace 73 will intersect the traces 61 to 64.

In view of the requirements (1) to (5), it is desired that the traces 61 to 64 do not intersect one another. Furthermore, it is desired that the traces 61 to 64 are as far away from one another as possible. Thus, it is desired that the distance between the selection terminal 10BT and the selection terminal 10AT is greater than the distance between the selection terminal 10BT and the selection terminal 10CR. It is desired that the trace 61 and the selection terminal 10BT are as far away from each other as possible so that an isolation of about 60 dB or greater is provided between the antenna terminal and the Tx of the band B (Band 28B) (the requirement (4)). It is desired that the trace 62 and the selection terminal 10AT are as far away from each other as possible so that an isolation of about 60 dB or greater is provided between the antenna terminal and the Tx of the band A (Band 28A) (the requirement (2)).

It is desired that the distance between the reception output terminal 130 and the reception output terminal 120 is greater than the distance between the reception output terminal 110 and the reception output terminal 120. As illustrated in FIG. 5, the reception output terminals 110 to 130 in the present embodiment are input terminals of the reception amplifier circuit 3R. When the mounting substrate 90 is viewed in plan, the reception output terminals 120, 110, and 130 lie side by side in the stated order. Thus, the distance between the reception output terminal 130 and the reception output terminal 120 is greater than the distance between the reception output terminal 110 and the reception output terminal 120.

This layout ensures that the reception output terminal 130 for reception signals in the band C is at a great distance from the reception output terminal 120 for reception signals in the band A, and the aforementioned requirement (6) is satisfied accordingly.

Figure 6:
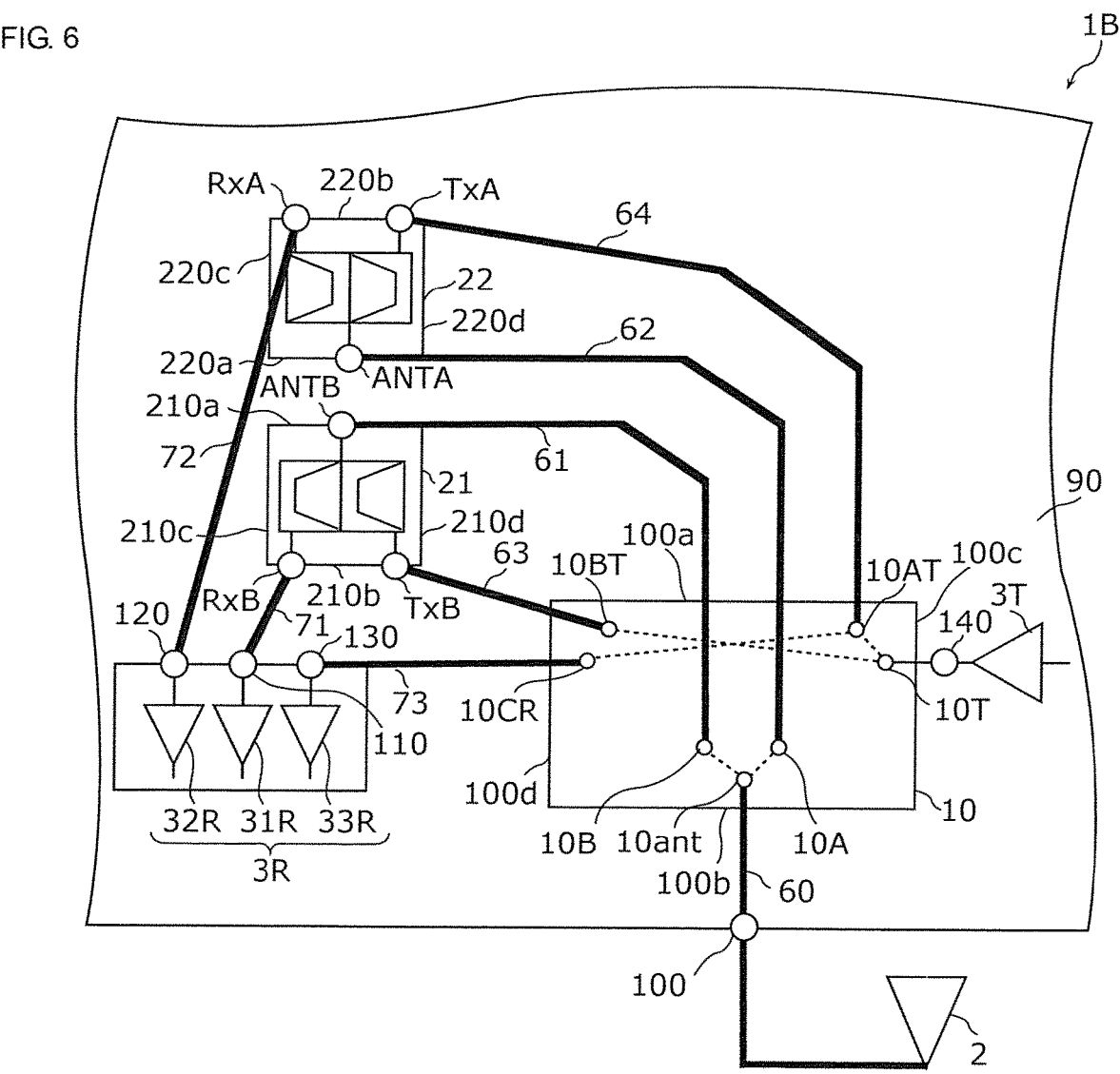
FIG. 6 is a schematic diagram illustrating a layout a radio-frequency module according to a modification viewed in plan.

FIG. 6 is a schematic diagram illustrating a layout a radio-frequency module 1B according to a modification viewed in plan. The layout of the circuit elements of the radio-frequency module 1 according to the present embodiment is embodied in the radio-frequency module 1B illustrated in FIG. 6. As illustrated in FIG. 6, the constituent components of the radio-frequency module 1B such as the common input/output terminal 100, the transmission input terminal 140, the reception output terminals 110 to 130, the duplexers 21 and 22, and the switch 10 are mounted on the mounting substrate 90. The difference between the radio-frequency module 1B according to the present modification and the radio-frequency module 1A according to Example 1 is in the layout of the switch 10 and in the layout of the traces 61 to 64 and 73. Configurations common to the radio-frequency module 1B according to the present modification and the radio-frequency module 1A according to Example 1 will be omitted from the following description, which will be given while focusing on distinctive features of the radio-frequency module 1B.

With the sides 100a, 100b, 100c, and 100d defining the outer periphery of the switch 10, the side 100a (the third side) and the duplexers 21 and 22 are disposed in such a manner that the sides other than the side 100a of the switch 10 are not located between the switch 10 and each of the duplexers 21 and 22 and in such a manner that the transmission input terminal 140 and the reception output terminals 110 to 130 are not located between the switch 10 and each of the duplexers 21 and 22. The side 100a of the switch 10 according to Example 1 faces the side 210d of the duplexer 21 and the side 220d of the duplexer 22, whereas the side 100a of the switch 10 according to the present modification does not face the side 210d of the duplexer 21 and the side 220d of the duplexer 22.

The common terminal 10T, the selection terminal 10AT, the selection terminal 10BT, and the selection terminal 10CR in the switch 10 are disposed closer to the side 100a than to the center point of the switch 10, and the common terminal 10T, the selection terminal 10AT, the selection terminal 10BT, and the selection terminal 10CR are disposed along the side 100a in the stated order in such a direction that an imaginary line linking the terminal TxB to the selection terminal 10BT does not intersect an imaginary line linking the terminal TxA to the selection terminal 10AT.

In the layout above, the trace 61 connected to the terminal ANTB and the trace 62 connected to the terminal ANTA intersect the side 100a, lie between the selection terminal 10AT and the selection terminal 10BT, and are connected respectively to the selection terminal 10B and the selection terminal 10A. Thus, the trace 64 linking the terminal TxA to the selection terminal 10AT, the trace 62 linking the terminal ANTA to the selection terminal 10A, the trace 61 linking the terminal ANTB to the selection terminal 10B, and the trace 63 linking the terminal TxB to the selection terminal 10BT lie side by side in the stated order and do not intersect one another.

That is, the traces 61 to 64 through which high-power radio-frequency signals flow neither intersect one another nor intersect other traces, and the aforementioned requirements (1) to (5) are satisfied accordingly.

Since the common terminal 10T, the selection terminal 10AT, the selection terminal 10BT, and the selection terminal 10CR lie side by side in the stated order, the trace 73 linking the reception output terminal 130 to the selection terminal 10CR is closer to the outer side portion than the trace 63 is, with the trace 63 being closer to the outer side portion than the traces 61, 62, and 64 are. This layout eliminates or reduces the possibility that the trace 73 will intersect the traces 61 to 64.

In view of the requirements (1) to (5), it is desired that the traces 61 to 64 do not intersect one another. Furthermore, it is desired that the traces 61 to 64 are as far away from one another as possible. Thus, it is desired that the distance between the selection terminal 10BT and the selection terminal 10AT is greater than the distance between the selection terminal 10BT and the selection terminal 10CR.

It is desired that the distance between the reception output terminal 130 and the reception output terminal 120 is greater than the distance between the reception output terminal 110 and the reception output terminal 120. As illustrated in FIG. 6, the reception output terminals 110 to 130 in the present modification are input terminals of the reception amplifier circuit 3R. When the mounting substrate 90 is viewed in plan, the reception output terminals 120, 110, and 130 lie side by side in the stated order. Thus, the distance between the reception output terminal 130 and the reception output terminal 120 is greater than the distance between the reception output terminal 110 and the reception output terminal 120.

This layout ensures that the reception output terminal 130 for reception signals in the band C is at a great distance from the reception output terminal 120 for reception signals in the band A, and the aforementioned requirement (6) is satisfied accordingly.

That is, both the radio-frequency module according to Example 1 and the radio-frequency module according to the present modification are configured as follows: (A) the side 210a (the first side) of the duplexer 21 and the side 220a (the second side) of the duplexer 22 are disposed in such a manner that the sides other than the side 210a of the duplexer 21 and the sides other than the side 220a of the duplexer 22 are not located between the side 210a and the side 220a and in such a manner that the switch 10, the transmission input terminal 140, and the reception output terminals 110 to 130 are not located between the side 210a and the side 220a; (B) with the sides 100a, 100b, 100c, and 100d defining the outer periphery of the switch 10, the side 100a (the third side) and the duplexers 21 and 22 are disposed in such a manner that the sides other than the side 100a of the switch 10 are not located between the switch 10 and each of the duplexers 21 and 22 and in such a manner that the transmission input terminal 140 and the reception output terminals 110 to 130 are not located between the switch 10 and each of the duplexers 21 and 22; and (C) the common terminal 10T, the selection terminal 10AT, the selection terminal 10BT, and the selection terminal 10CR in the switch 10 are disposed closer to the side 100a than to the center point of the switch 10, and the common terminal 10T, the selection terminal 10AT, the selection terminal 10BT, and the selection terminal 10CR are disposed along the side 100a in the stated order in such a direction that an imaginary line linking the terminal TxB to the selection terminal 10BT does not intersect an imaginary line linking the terminal TxA to the selection terminal 10AT.

Thus, the traces 61 to 64 through which high-power radio-frequency signals flow neither intersect one another nor intersect other traces, and the aforementioned requirements (1) to (5) are satisfied accordingly.

Figure 7A:
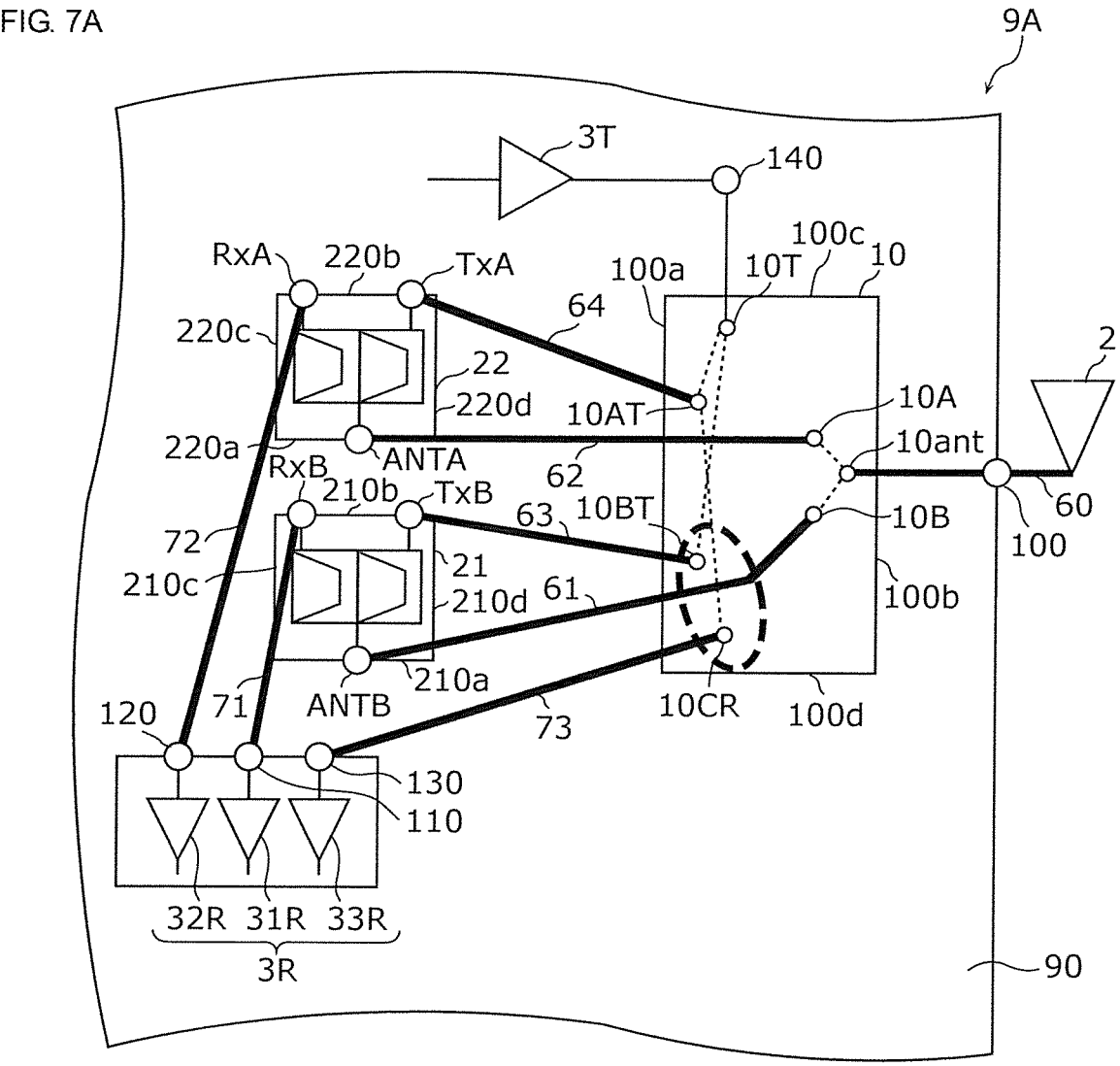
FIG. 7A is a schematic diagram illustrating a layout of a radio-frequency module according to Example 2 viewed in plan.

FIG. 7A is a schematic diagram illustrating a layout of a radio-frequency module 9A according to Example 2 viewed in plan. The layout of the circuit elements of the radio-frequency module 1 according to the present embodiment is embodied in the radio-frequency module 9A illustrated in FIG. 7A. As illustrated in FIG. 7A, the constituent components of the radio-frequency module 9A such as the common input/output terminal 100, the transmission input terminal 140, the reception output terminals 110 to 130, the duplexers 21 and 22, and the switch 10 are mounted on the mounting substrate 90. The difference between the radio-frequency module 9A according to Example 2 and the radio-frequency module 1A according to Example 1 is in the layout of the duplexer 21 and in the layout of the traces 61 and 63. Configurations common to the radio-frequency module 9A according to Example 2 and the radio-frequency module 1A according to Example 1 will be omitted from the following description, which will be given while focusing on distinctive features of the radio-frequency module 9A.

With the sides 210a, 210b, 210c, and 210d defining the outer periphery of the duplexer 21, the terminal ANTB is disposed adjacent to the side 210a and the terminals TxB and RxB are disposed adjacent to the side 210b when the mounting substrate 90 is viewed in plan. Alternatively, the terminal TxB may be disposed adjacent to the side 210d and the terminal RxB may be disposed adjacent to the side 210c. It is desired that the terminal ANTB is disposed as far away from the terminals TxB and RxB as possible and that the terminals TxB and RxB are disposed as far away from each other as possible. This layout of the terminals ANTB, TxB, and RxB of the duplexer 21 enables optimization of the isolation between the antenna terminal, the transmission terminal, and the reception terminal of the duplexer 21.

With the sides 220a, 220b, 220c, and 220d defining the outer periphery of the duplexer 22, the terminal ANTA is disposed adjacent to the side 220a and the terminals TxA and RxA are disposed adjacent to the side 220b when the mounting substrate 90 is viewed in plan. Alternatively, the terminal TxA may be disposed adjacent to the side 220d and the terminal RxA may be disposed adjacent to the side 220c. It is desired that the terminal ANTA is disposed as far away from the terminals TxA and RxA as possible and that the terminals TxA and RxA are disposed as far away from each other as possible. This layout of the terminals ANTA, TxA, and RxA of the duplexer 22 enables optimization of the isolation between the antenna terminal, the transmission terminal, and the reception terminal of the duplexer 22.

The side 210a of the duplexer 21 and the side 220a of the duplexer 22 are disposed with the side 210b of the duplexer 21 interposed between the sides 210a and 220a. That is, the terminal ANTA and the terminal ANTB are disposed with the terminals TxB and RxB interposed therebetween.

With the sides 100a, 100b, 100c, and 100d defining the outer periphery of the switch 10, the side 100a and the duplexers 21 and 22 are disposed in such a manner that the sides other than the side 100a of the switch 10 are not located between the switch 10 and each of the duplexers 21 and 22 and in such a manner that the transmission input terminal 140 and the reception output terminals 110 to 130 are not located between the switch 10 and each of the duplexers 21 and 22.

The common terminal 10T, the selection terminal 10AT, the selection terminal 10BT, and the selection terminal 10CR in the switch 10 are disposed closer to the side 100a than to the center point of the switch 10, and the common terminal 10T, the selection terminal 10AT, the selection terminal 10BT, and the selection terminal 10CR are disposed along the side 100a in the stated order in such a direction that an imaginary line linking the terminal TxB to the selection terminal 10BT does not intersect an imaginary line (the trace 64 in FIG. 7A) linking the terminal TxA to the selection terminal 10AT.

This configuration enables one switch 10 to switch between the state in which the common input/output terminal 100 is connected to the duplexer 21 and the state in which the common input/output terminal 100 is connected to the duplexer 22 and to switch between the state in which the transmitting filter 22T is connected to the reception output terminal 130 and the state in which the transmitting filter 22T is connected to the transmission input terminal 140. This is conducive to providing the radio-frequency module 9A having a simplified and compact circuit configuration and being capable of transmitting radio-frequency signals in a plurality of communication bands where there is an inclusion relation between the transmission band of one communication band and the reception band of another communication band.

In the layout above, the trace 61 connected to the terminal ANTB intersects the side 100a, lies between the selection terminal 10BT and the selection terminal 10CR, and is connected to the selection terminal 10B. The trace 62 connected to the terminal ANTA intersects the side 100a, lies between the selection terminal 10AT and the selection terminal 10BT, and are connected to the selection terminal 10A. Thus, the trace 64 linking the terminal TxA to the selection terminal 10AT, the trace 62 linking the terminal ANTA to the selection terminal 10A, the trace 63 linking the terminal TxB to the selection terminal 10BT, and the trace 61 linking the terminal ANTB to the selection terminal 10B lie side by side in the stated order and do not intersect one another.

Although each of the traces 61 and 62 is desirably as far away from other traces as possible, the traces 61 and 62 lie between two respective selection terminals. This layout makes it difficult to ensure both a great distance between the selection terminal 10BT and the selection terminal 10CR and a great distance between the selection terminal 10AT and the selection terminal 10BT. As a result, the trace 61 or the trace 62 may be located close to the selection terminal 10AT or the selection terminal 10BT. It is thus difficult to provide an isolation of about 60 dB or greater in a manner so as to meet the requirement (2) or (4).

Figure 7B:
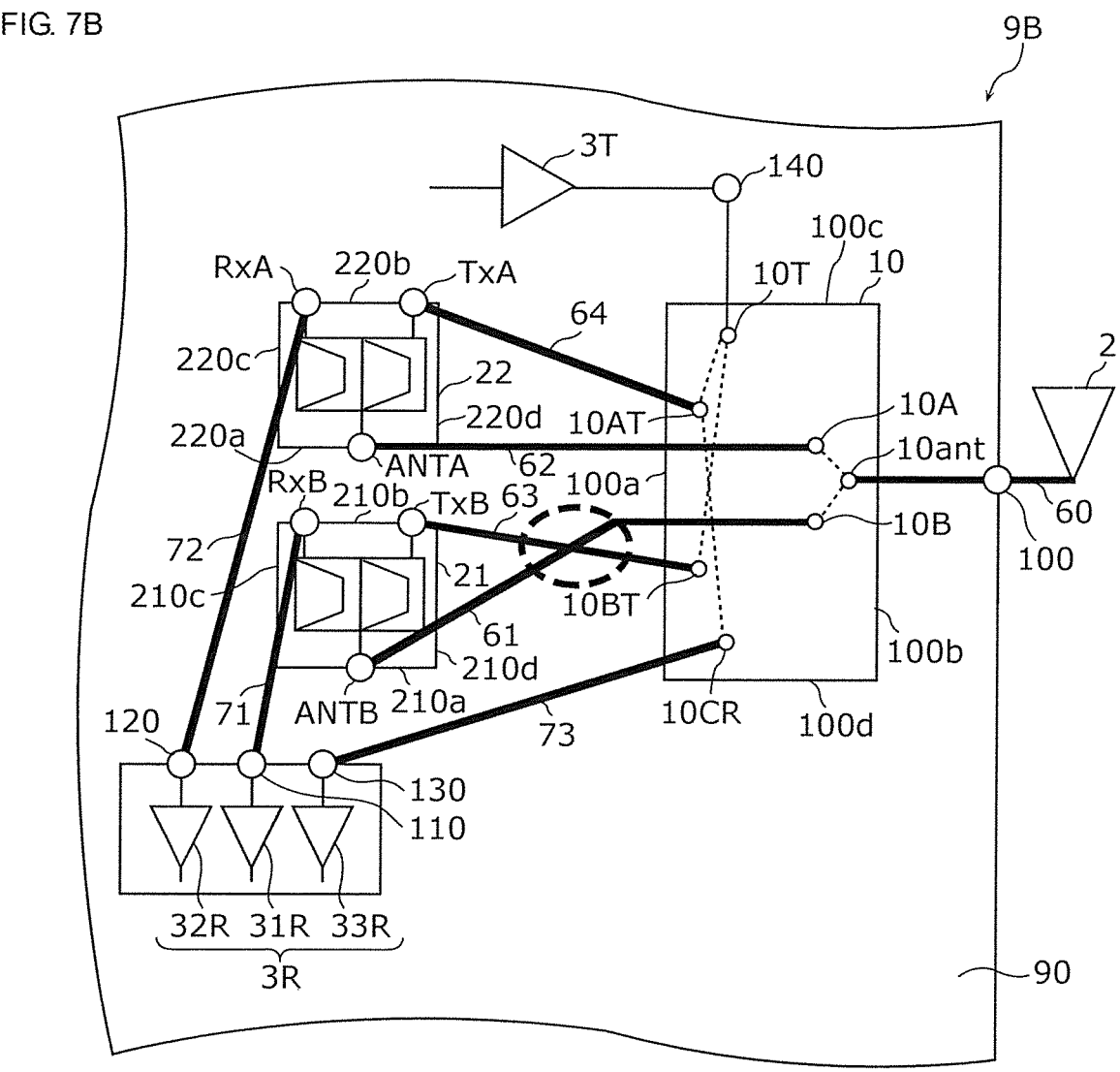
FIG. 7B is a schematic diagram illustrating a layout of a radio-frequency module according to Example 3 viewed in plan.

FIG. 7B is a schematic diagram illustrating a layout of a radio-frequency module 9B according to Example 3 viewed in plan. The layout of the circuit elements of the radio-frequency module 1 according to the present embodiment is embodied in the radio-frequency module 9B illustrated in FIG. 7B. As illustrated in FIG. 7B, the constituent components of the radio-frequency module 9B such as the common input/output terminal 100, the transmission input terminal 140, the reception output terminals 110 to 130, the duplexers 21 and 22, and the switch 10 are mounted on the mounting substrate 90. The difference between the radio-frequency module 9B according to Example 3 and the radio-frequency module 9A according to Example 2 is only in the layout of the trace 61. Configurations common to the radio-frequency module 9B according to Example 3 and the radio-frequency module 9A according to Example 2 will be omitted from the following description, which will be given while focusing on distinctive features of the radio-frequency module 9B.

The side 210a of the duplexer 21 and the side 220a of the duplexer 22 are disposed with the side 210b of the duplexer 21 interposed between the sides 210a and 220a. That is, the terminal ANTA and the terminal ANTB are disposed with the terminals TxB and RxB interposed therebetween.

The common terminal 10T, the selection terminal 10AT, the selection terminal 10BT, and the selection terminal 10CR in the switch 10 are disposed closer to the side 100a than to the center point of the switch 10, and the common terminal 10T, the selection terminal 10AT, the selection terminal 10BT, and the selection terminal 10CR are disposed along the side 100a in the stated order in such a direction that an imaginary line linking the terminal TxB to the selection terminal 10BT does not intersect an imaginary line (the trace 64 in FIG. 7B) linking the terminal TxA to the selection terminal 10AT.

This configuration enables one switch 10 to switch between the state in which the common input/output terminal 100 is connected to the duplexer 21 and the state in which the common input/output terminal 100 is connected to the duplexer 22 and to switch between the state in which the transmitting filter 22T is connected to the reception output terminal 130 and the state in which the transmitting filter 22T is connected to the transmission input terminal 140. This is conducive to providing the radio-frequency module 9B having a simplified and compact circuit configuration and being capable of transmitting radio-frequency signals in a plurality of communication bands where there is an inclusion relation between the transmission band of one communication band and the reception band of another communication band.

In the layout above, the trace 61 connected to the terminal ANTB intersects the side 100a, lies between the selection terminal 10AT and the selection terminal 10BT, and are connected to the selection terminal 10B. The trace 62 connected to the terminal ANTA intersects the side 100a, lies between the selection terminal 10AT and the selection terminal 10BT, and are connected to the selection terminal 10A. The trace 61 intersects the trace 63 accordingly. It is thus difficult to provide an isolation of about 60 dB or greater in a manner so as to meet the requirement (4).

FIG. 8 is a schematic diagram illustrating a layout of a radio-frequency module 9C according to Example 4 viewed in plan. The layout of the circuit elements of the radio-frequency module 1 according to the present embodiment is embodied in the radio-frequency module 9C illustrated in FIG. 8. As illustrated in FIG. 8, the constituent components of the radio-frequency module 9C such as the common input/output terminal 100, the transmission input terminal 140, the reception output terminals 110 to 130, the duplexers 21 and 22, and the switch 10 are mounted on the mounting substrate 90. The difference between the radio-frequency module 9C according to Example 4 and the radio-frequency module 9A according to Example 2 is in the layout of the duplexer 22 and in the layout of the traces 62 and 64. Configurations common to the radio-frequency module 9C according to Example 4 and the radio-frequency module 9A according to Example 2 will be omitted from the following description, which will be given while focusing on distinctive features of the radio-frequency module 9C.

With the sides 220a, 220b, 220c, and 220d defining the outer periphery of the duplexer 22, the terminal ANTA is disposed adjacent to the side 220a and the terminals TxA and RxA are disposed adjacent to the side 220b when the mounting substrate 90 is viewed in plan. Alternatively, the terminal TxA may be disposed adjacent to the side 220d and the terminal RxA may be disposed adjacent to the side 220c. It is desired that the terminal ANTA is disposed as far away from the terminals TxA and RxA as possible and that the terminals TxA and RxA are disposed as far away from each other as possible. This layout of the terminals ANTA, TxA, and RxA of the duplexer 22 enables optimization of the isolation between the antenna terminal, the transmission terminal, and the reception terminal of the duplexer 22.

The side 210a of the duplexer 21 and the side 220a of the duplexer 22 are disposed with the side 210b of the duplexer 21 and the side 220b of the duplexer 22 interposed between the sides 210a and 220a. That is, the terminal ANTA and the terminal ANTB are disposed with the terminals TxA and RxA and the terminals TxB and RxB interposed therebetween.

With the sides 100a, 100b, 100c, and 100d defining the outer periphery of the switch 10, the side 100a and the duplexers 21 and 22 are disposed in such a manner that the sides other than the side 100a of the switch 10 are not located between the switch 10 and each of the duplexers 21 and 22 and in such a manner that the transmission input terminal 140 and the reception output terminals 110 to 130 are not located between the switch 10 and each of the duplexers 21 and 22.

The common terminal 10T, the selection terminal 10AT, the selection terminal 10BT, and the selection terminal 10CR in the switch 10 are disposed closer to the side 100a than to the center point of the switch 10, and the common terminal 10T, the selection terminal 10AT, the selection terminal 10BT, and the selection terminal 10CR are disposed along the side 100a in the stated order in such a direction that an imaginary line (the trace 63 in FIG. 8) linking the terminal TxB to the selection terminal 10BT does not intersect an imaginary line (the trace 64 in FIG. 8) linking the terminal TxA to the selection terminal 10AT.

This configuration enables one switch 10 to switch between the state in which the common input/output terminal 100 is connected to the duplexer 21 and the state in which the common input/output terminal 100 is connected to the duplexer 22 and to switch between the state in which the transmitting filter 22T is connected to the reception output terminal 130 and the state in which the transmitting filter 22T is connected to the transmission input terminal 140. This is conducive to providing the radio-frequency module 9C having a simplified and compact circuit configuration and being capable of transmitting radio-frequency signals in a plurality of communication bands where there is an inclusion relation between the transmission band of one communication band and the reception band of another communication band.

In the layout above, the trace 61 connected to the terminal ANTB intersects the side 100a, lies between the selection terminal 10BT and the selection terminal 10CR, and are connected to the selection terminal 10B. The trace 62 connected to the terminal ANTA intersects the side 100a, lies between the common terminal 10T and the selection terminal 10AT, and are connected to the selection terminal 10A. Thus, the trace 62 linking the terminal ANTA to the selection terminal 10A, the trace 64 linking the terminal TxA to the selection terminal 10AT, the trace 63 linking the terminal TxB to the selection terminal 10BT, and the trace 61 linking the terminal ANTB to the selection terminal 10B lie side by side in the stated order and do not intersect one another.

Although the trace 62 is desirably as far away from other traces as possible, the trace 62 lies between the common terminal 10T and the selection terminal 10AT. To attain the maximum possible isolation between the antenna terminal and the Tx of the band A (Band 28A), it is desired that the trace 62 is as far away from the common terminal 10T and the selection terminal 10AT as possible. Although the trace 61 is desirably as far away from other traces as possible, the trace 61 lies between the selection terminal 10BT and the selection terminal 10CR. To attain the maximum possible isolation between the antenna terminal and the Tx of the band B (Band 28B), it is desired that the trace 61 is as far away from the selection terminal 10BT as possible.

It difficult to meet all these requirements on spacing. As a result, the trace 61 or the trace 62 may be located close to the selection terminal 10AT, the selection terminal 10BT, or the common terminal 10T. It is thus difficult to provide an isolation of about 60 dB or greater in a manner so as to meet the requirement (2) or (4).

Other Embodiments

An embodiment and modifications thereof have been described so far as examples of the radio-frequency module and the communication device according to the present disclosure. However, the present disclosure is not limited to the embodiment above and the modifications thereof. The present disclosure embraces other embodiments implemented by varying combinations of constituent components of the embodiment above and the modifications thereof, other modifications achieved through various alterations to the embodiment above that may be conceived by those skilled in the art within a range not departing from the spirit of the present disclosure, and various types of apparatuses including the radio-frequency module and the communication device according to the present disclosure.

Furthermore, in the radio-frequency module and the communication device according to any one of embodiments, examples, and modifications of the present disclosure, matching elements such as inductors and capacitors and switching circuits may be connected between the individual constituent components. Such an inductor may be a wire inductor including a wire that forms a connection between the individual constituent components.

The present disclosure may be widely used as radio-frequency modules and communication devices in communication apparatuses for multi-band systems, such as mobile phones.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio-frequency module that transmits radio-frequency signals in a first communication band, in a second communication band, and in a third communication band, the first to third communication bands being different frequency bands, a transmission band of the second communication band including a reception band of the third communication band, the radio-frequency module comprising:
   a common input/output terminal;
   a first input terminal to which radio-frequency transmission signals are inputted;
   a first output terminal from which radio-frequency reception signals in the first communication band are outputted;
   a second output terminal from which radio-frequency reception signals in the second communication band are outputted;
   a third output terminal from which radio-frequency reception signals in the third communication band are outputted;
   a first transmitting filter whose pass band is a transmission band of the first communication band;
   a first receiving filter whose pass band is a reception band of the first communication band;
   a second transmitting filter whose pass band is the transmission band of the second communication band;
   a second receiving filter whose pass band is a reception band of the second communication band; and
   a switch including a first common terminal, a second common terminal, a first selection terminal, a second selection terminal, a third selection terminal, a fourth selection terminal, and a fifth selection terminal, the switch being configured as one chip,
      the first common terminal being connected to the common input/output terminal,
      the second common terminal being connected to the first input terminal,
      an output terminal of the first transmitting filter and an input terminal of the first receiving filter being connected to the first selection terminal,
      an output terminal of the second transmitting filter and an input terminal of the second receiving filter being connected to the second selection terminal,
      an input terminal of the first transmitting filter being connected to the third selection terminal,
      an input terminal of the second transmitting filter being connected to the fourth selection terminal,
      an output terminal of the first receiving filter being connected to the first output terminal,
      an output terminal of the second receiving filter being connected to the second output terminal, and
      the fifth selection terminal being connected to the third output terminal,
   wherein the first transmitting filter and the first receiving filter constitute a first duplexer,
   wherein the second transmitting filter and the second receiving filter constitute a second duplexer,
   wherein the first duplexer, the second duplexer, and the switch are mounted on a mounting substrate,
   wherein the first duplexer includes: a first antenna terminal configured for shared use as an output terminal of the first transmitting filter and an input terminal of the first receiving filter; a first transmission terminal configured as the input terminal of the first transmitting filter; and a first reception terminal configured as the output terminal of the first receiving filter,
   wherein the second duplexer includes: a second antenna terminal configured for shared use as an output terminal of the second transmitting filter and an input terminal of the second receiving filter; a second transmission terminal configured as the input terminal of the second transmitting filter; and a second reception terminal configured as the output terminal of the second receiving filter, and
   wherein when the mounting substrate is viewed in plan:
      the first antenna terminal is disposed adjacent to a first side included in an outer periphery of the first duplexer, and the first transmission terminal and the first reception terminal are disposed adjacent to another side included in the outer periphery of the first duplexer,
      the second antenna terminal is disposed adjacent to a second side included in the outer periphery of the second duplexer, and the second transmission terminal and the second reception terminal are disposed adjacent to another side included in the outer periphery of the second duplexer,
      the first side and the second side are disposed in such a manner that no sides other than the first side that are included in the outer periphery of the first duplexer and no sides other than the second side that are included in the outer periphery of the second duplexer are located between the first side and the second side and in such a manner that the switch, the first input terminal, the first output terminal, the second output terminal, and the third output terminal are not located between the first side and the second side,
      the first side and the second side are opposite to each other,
      a third side included in an outer periphery of the switch and the first duplexer and the second duplexer are disposed in such a manner that sides other than the third side that are included in the outer periphery of the switch are not located between the switch and each of the first duplexer and the second duplexer and in such a manner that the first input terminal, the first output terminal, the second output terminal, and the third output terminal are not located between the switch and each of the first duplexer and the second duplexer, and the second common terminal, the fourth selection terminal, the third selection terminal, and the fifth selection terminal in the switch are disposed closer to the third side than to a center point of the switch and are disposed in a stated order in such a manner that an imaginary line linking the first transmission terminal and the fourth selection terminal does not intersect an imaginary line linking the second transmission terminal to the third selection terminal.

2. The radio-frequency module according to claim 1, wherein for transmission of transmission signals and reception signals in the first communication band, the switch is set to a state in which the first common terminal is electrically connected to the first selection terminal and the second common terminal is electrically connected to the third selection terminal, for transmission of transmission signals and reception signals in the second communication band, the switch is set to a state in which the first common terminal is electrically connected to the second selection terminal and the second common terminal is electrically connected to the fourth selection terminal, and for transmission of reception signals in the third communication band, the switch is set to a state in which the first common terminal is electrically connected to the second selection terminal and the fourth selection terminal is electrically connected to the fifth selection terminal.

3. The radio-frequency module according to claim 2, wherein the switch is included in a switching IC, and
the switching IC includes, in addition to the switch, a control circuit that provides the switch with a control signal for switching between presence and absence of electrical connection between the terminals.

4. The radio-frequency module according to claim 2, wherein the first communication band is long term evolution (LTE) band,
the second communication band is LTE band, and
the third communication band is LTE band.

5. A communication device, comprising:

a radio-frequency signal processing circuit that processes radio-frequency signals transmitted or received via an antenna element;

the radio-frequency module according to claim 2 that transmits the radio-frequency signals between the antenna element and the radio-frequency signal processing circuit;

a reception amplifier circuit disposed between the radio-frequency signal processing circuit and each of the first to third output terminals and configured to amplify radio-frequency signals in the reception band of the first communication band, radio-frequency signals in the reception band of the second communication band, and radio-frequency signals in the reception band of the third communication band; and a transmission amplifier circuit disposed between the radio-frequency signal processing circuit and the first input terminal and configured to amplify radio-frequency signals in the transmission band of the first communication band and radio-frequency signals in the transmission band of the second communication band.

6. The radio-frequency module according to claim 1, wherein the third side included in the outer periphery of the switch faces sides of the first duplexer and the second duplexer other than the first side and the second side, respectively.

7. The radio-frequency module according to claim 1, wherein the third side included in the outer periphery of the switch does not face sides of the first duplexer and the second duplexer other than the first side and the second side, respectively.

8. The radio-frequency module according to claim 1, wherein a distance between the third selection terminal and the fourth selection terminal is greater than a distance between the third selection terminal and the fifth selection terminal.

9. The radio-frequency module according to claim 8, wherein a distance between the third output terminal and the second output terminal is greater than a distance between the first output terminal and the second output terminal.

10. The radio-frequency module according to claim 1, wherein a distance between the third output terminal and the second output terminal is greater than a distance between the first output terminal and the second output terminal.

11. The radio-frequency module according to claim 1, wherein the switch is included in a switching IC, and
the switching IC includes, in addition to the switch, a control circuit that provides the switch with a control signal for switching between presence and absence of electrical connection between the terminals.

12. The radio-frequency module according to claim 1, wherein the first communication band is long term evolution (LTE) band,
the second communication band is LTE band, and
the third communication band is LTE band.

13. A communication device, comprising:

a radio-frequency signal processing circuit that processes radio-frequency signals transmitted or received via an antenna element;

the radio-frequency module according to claim 1 that transmits the radio-frequency signals between the antenna element and the radio-frequency signal processing circuit;

a reception amplifier circuit disposed between the radio-frequency signal processing circuit and each of the first to third output terminals and configured to amplify radio-frequency signals in the reception band of the first communication band, radio-frequency signals in the reception band of the second communication band, and radio-frequency signals in the reception band of the third communication band; and a transmission amplifier circuit disposed between the radio-frequency signal processing circuit and the first input terminal and configured to amplify radio-frequency signals in the transmission band of the first communication band and radio-frequency signals in the transmission band of the second communication band.

14. The radio-frequency module according to claim 1, wherein each of the first common terminal and the second common terminal of the switch is configured to simultaneously connect to at least two of the first selection terminal, the second selection terminal, the third selection terminal, the fourth selection terminal, and the fifth selection terminal.

* * * * *